June 21, 1932. C. J. RODMAN ET AL 1,864,095
OIL RECLAIMING AND PURIFYING SYSTEM
Filed Dec. 30, 1929
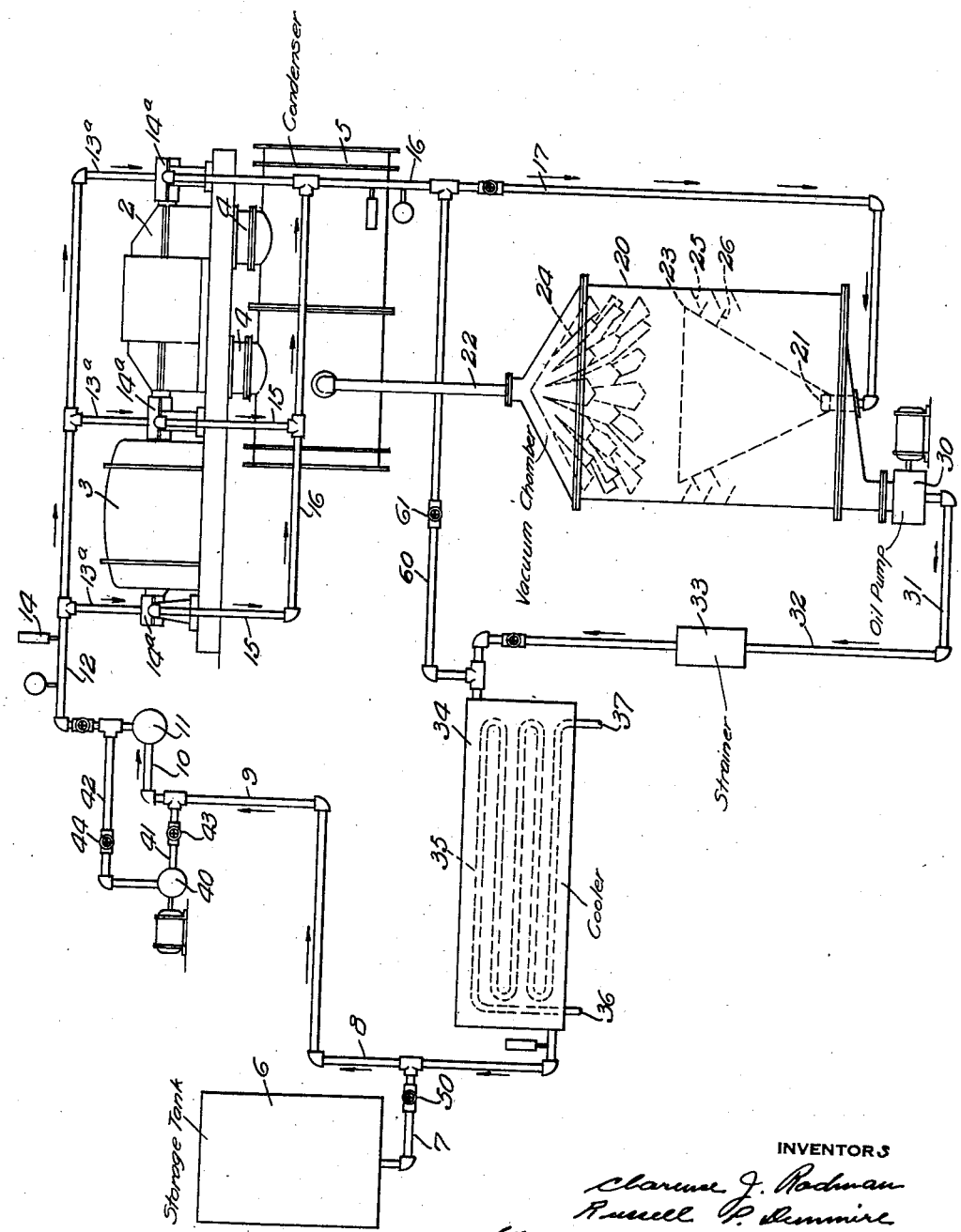
INVENTORS Patented June 21, 1932

1,864,095

UNITED STATES PATENT OFFICE

CLARENCE J. RODMAN AND RUSSELL P. DUNMIRE, OF ALLIANCE, OHIO, ASSIGNORS TO THE BUCKEYE TWIST DRILL COMPANY, OF ALLIANCE, OHIO, A CORPORATION OF OHIO

OIL RECLAIMING AND PURIFYING SYSTEM

Application filed December 30, 1929. Serial No. 417,355.

This invention relates generally to oil purifying and reclaiming systems, and more particularly to such systems for purifying and reclaiming oil which has been used to lubricate the bearings of an engine.

The purifying apparatus according to our invention can be easily applied to existing installations in order to insure not only removal of solid matter with which the oil may become contaminated, but also the removal of dissolved gases and water.

The drawing illustrates in a diagrammatic manner the application of the oil purifying apparatus to a turbo-generator set. The invention, however, is applicable to all types of lubricating systems having a source of vacuum to which the vacuum chamber hereinafter more fully described can be connected.

Referring more particularly to the drawing, a turbine 2 drives a generator 3. The turbine is connected through conduits 4 to a condenser 5.

Oil is supplied to the oil distributing system from a storage tank 6 through a conduit 7 to conduits 8, 9 and 10. A main oil pump 11 pumps oil from the conduit 10 to a main conduit 12 provided with a pressure indicator 13 and a thermometer 14. The pressure of the oil ordinarily is from 40 to 60 pounds per square inch and its temperature is about 80° F. The oil flows from the conduit 12 through branch conduits 13a to lubricate the bearings 14a of the turbo-generator set. After having lubricated the bearings, the oil flows through branch conduits 15 into a conduit 16 and then is conveyed through conduit 17 to a vacuum chamber 20.

The vacuum chamber 20 has a nozzle 21 adjacent the bottom of the tank which sprays and atomizes the oil flowing through the conduit 17. The oil in the conduit 17 is still under pressure of about 40 to 60 pounds per square inch, but its temperature has been raised while lubricating the bearings to about 140° F. The vacuum chamber is connected adjacent its top by a conduit 22 connected to the condenser 5. The condensation of the exhaust steam from the turbine 2 in the condenser 5 provides a vacuum in the condenser, and since the condenser is connected through the conduit 22 to the chamber 20, the chamber is maintained under a vacuum. The chamber is provided with a conical baffle 23 which guides the oil sprayed from the nozzle 21 into contact with a series of baffles 24 adjacent the top of the chamber. The baffles 24 are of general trough shape and each tier or set of baffles is arranged in staggered relationship with the set immediately above and below it.

This arrangement of the baffles 24 provides a tortuous passage through which the gases liberated when the oil is sprayed under pressure from the nozzle 21 into the vacuum chamber may escape into the conduit 22 and from thence into the condenser 5. The baffles 24, however, prevent the escape of oil from the chamber. The oil is collected by the baffles 24 and flows downward by gravity following a tortuous passage formed by the baffles 25 and 26 and collects at the bottom of the chamber. It will be seen that the oil sprayed from the nozzle 21 is under a relatively high pressure and that it is heated. When the oil is sprayed from the nozzle into the vacuum chamber, the sudden relief in pressure liberates the gases and dissolved water.

The purified oil which collects in the bottom of the vacuum chamber 20 is forced by a pump 30 through conduits 31 and 32 through a strainer or filter 33 which removes any solid particles which may contaminate the oil and is delivered to a cooler 34. The cooler has a cooling coil 35 having inlet and outlet connections 36 and 37. After the oil has passed through the cooler, its temperature has been reduced to about 80° F. From the cooler, the cooled purified oil flows through conduit 8 from whence it returns to the oil distributing system for lubricating the bearings 14a.

An auxiliary oil pump 40 is connected by conduits 41 and 42 provided with valves 43 and 44 to conduits 9 and 12 in order that the oil may by-pass the pump 11 if it is necessary to shut it down for repairs. A valve 50 is provided in the conduit 7 connecting the oil storage tank 6 with the conduit 8 so that additional oil may be admitted to the system to replace that which is lost.

As above described, when the oil purifying apparatus is in operation, the oil flows from the conduit 16 through the conduit 17 into the vacuum chamber 20. However, in some cases it is not necessary that the purification of the oil be carried out continuously, and when such is the case the oil flows from the conduit 16 through conduit 60 provided with a valve 61 to the cooler 34.

The construction of the vacuum chamber is such that the oil which is collected by the baffles 24 must flow in a tortuous path in its descent to the bottom of the tank. During this passage, the oil is acted upon by the vacuum to remove dissolved moisture and gases.

Our invention is applicable not only to turbo-generator sets provided with a condenser which forms a source of vacuum, but also to any lubricating system in which a source of vacuum is available. For example, the purifying apparatus may be connected to a Diesel engine in a manner generally similar to that hereinabove described. In this case, the conduit 22 which conducts the gases from the vacuum chamber may be connected to the intake manifold of the engine.

An important feature of our invention is that by the use of a vacuum chamber the oil is free not only from its solid impurities, which may be accomplished in certain types of mechanical purifiers, but it is also freed from dissolved gases and moisture because of the shock to which it is subjected when oil under pressure is sprayed into the vacuum chamber.

We have illustrated and described one embodiment of our invention. It is to be understood, however, that the invention may be otherwise embodied within the scope of the following claims.

We claim:

1. In an oil purifying and reclaiming system for an engine having a condenser and an oil distributing system for lubricating the bearings, a vacuum chamber connected to the condenser, connections for conveying oil from the oil distributing system to the vacuum chamber, and means for returning purified oil from the vacuum chamber to the oil distributing system.

2. In an oil purifying and reclaiming system for a turbo-generator set, having a condenser and an oil distributing system for lubricating the bearings, a vacuum chamber connected to the condenser, connections for conveying oil from the oil distributing system to the vacuum chamber, a cooler, oil connections between the vacuum chamber and the cooler, and means for returning purified cooled oil from the cooler to the oil distributing system.

3. In an oil purifying and reclaiming system for an engine having a condenser and an oil distributing system for lubricating the bearings, a vacuum chamber connected to the condenser, connections for conveying oil from the oil distributing system to the vacuum chamber, said chamber having baffles therein to prevent escape of oil but allowing escape of gases therefrom, and means for returning purified oil from the vacuum chamber to the oil distributing system.

4. In an oil purifying and reclaiming system for an engine having a source of vacuum and an oil distributing system for lubricating the bearings, a vacuum chamber connected to the source of vacuum, connections for conveying oil from the oil distributing system to the vacuum chamber, said chamber comprising a spray nozzle adjacent the bottom thereof for atomizing the oil, and baffles arranged to prevent escape of oil but allow escape of gases, and means for returning purified oil from the vacuum chamber to the oil distributing system.

5. In an oil purifying and reclaiming system for an engine having a source of vacuum and an oil distributing system for lubricating the bearings, a vacuum chamber connected to the source of vacuum, connections for conveying oil from the oil distributing system to the vacuum chamber, the vacuum chamber comprising a spray nozzle adjacent the bottom thereof for atomizing the oil, and baffles arranged to prevent escape of oil but allow escape of gases, a cooler, oil connections between the vacuum chamber and cooler, and means for returning purified cooled oil from the cooler to the oil distributing system.

6. In an oil purifying and reclaiming system for an engine having a source of vacuum and an oil distributing system for lubricating the bearings, a vacuum chamber connected adjacent its top to the source of vacuum, connections for conveying oil from the oil distributing system to the vacuum chamber, a spray nozzle adjacent the bottom of the chamber connected to the oil distributing system, said nozzle being adapted to atomize the oil, baffles within the chamber for preventing escape of oil but allowing escape of gases, a cooler, connections for conveying purified oil from the vacuum chamber to the cooler, and means for returning purified cooled oil from the cooler to the oil distributing system.

7. In an oil purifying and reclaiming system for an engine having a source of vacuum and an oil distributing system for lubricating the bearings, a vacuum chamber connected adjacent its top to the source of vacuum, connections for conveying oil from the oil distributing system to the vacuum chamber, a spray nozzle adjacent the bottom of the chamber connected to the oil distributing system, said nozzle being adapted to atomize the oil, baffles within the chamber for preventing escape of oil but allowing escape of gases, a cooler, connections for conveying purified oil from the vacuum chamber to the cooler, means for returning purified cooled oil from the cooler to the oil distributing system, and a strainer or filter in the connections between the oil outlet of the vacuum chamber and the point where purified oil is returned to the oil distributing system.

In testimony whereof we have hereunto set our hands.

CLARENCE J. RODMAN.
RUSSELL P. DUNMIRE.